2 Sheets—Sheet 1.
E. J. MUYBRIDGE.
Method and Apparatus for Photographing Objects in Motion.
No. 212,865. Patented Mar. 4, 1879.
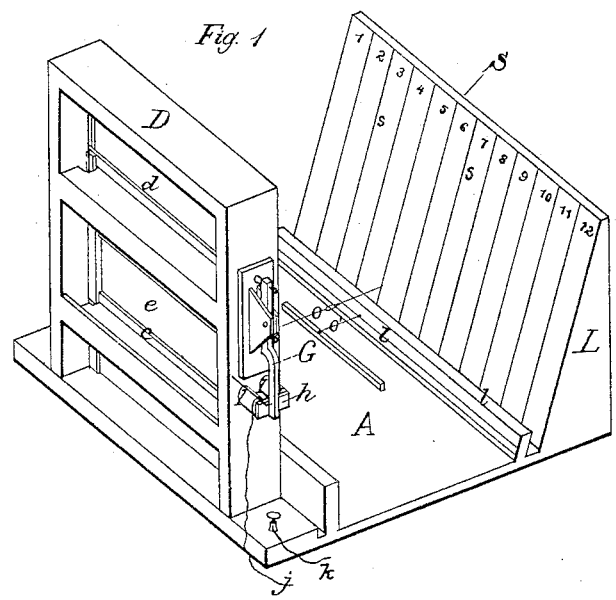
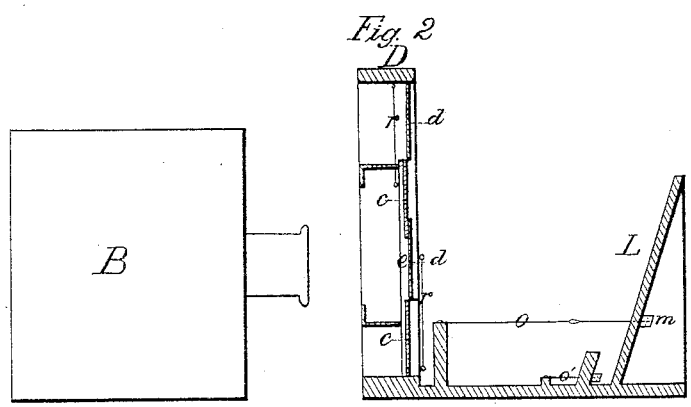
Witnesses
D. B. Lawler
W. F. Clark
Inventor
Edward J. Muybridge
per Jno. L. Boone
Attorney 2 Sheets—Sheet 2.

E. J. MUYBRIDGE.
Method and Apparatus for Photographing Objects in Motion.

No. 212,865. Patented Mar. 4, 1879.

Witnesses
D. B. Lawler.
W. F. Clark.

Inventor
Edward J. Muybridge
per Jno. L. Boone
Attorney

UNITED STATES PATENT OFFICE.

EDWARD J. MUYBRIDGE, OF SAN FRANCISCO, CALIFORNIA.

IMPROVEMENT IN THE METHOD AND APPARATUS FOR PHOTOGRAPHING OBJECTS IN MOTION.

Specification forming part of Letters Patent No. 212,865, dated March 4, 1879; application filed June 27, 1878.

*To all whom it may concern:*

Be it known that I, EDWARD J. MUYBRIDGE, of the city and county of San Francisco, State of California, have invented certain Improvements in Taking Instantaneous Photographs of Objects in Motion; and I do hereby declare that the following is a full, clear, and exact description thereof, reference being had to certain drawings accompanying this specification, and forming a part of the same.

My invention has reference to that branch of photography which is known as "instantaneous photography," and it applies more particularly where the object to be photographed is in rapid motion.

The principal object which I have in view is to take photographic views of horses that are moving rapidly under speed, in order to determine the posture, position, and relation of their limbs in different portions of their step or stride.

My invention relates to a double-acting slide, with the means for operating the same, and to a novel background, which is graduated or marked so as to gage the position of the horse and the posture of his limbs, all as hereinafter more fully described.

Figure 1:
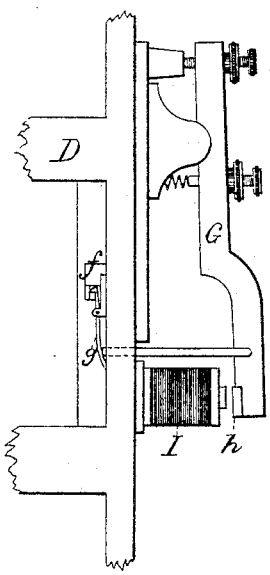
Figure 3:
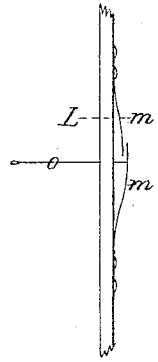
Figure 2:
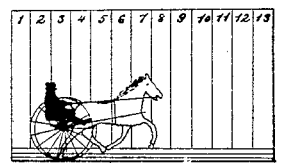

Referring to the accompanying drawings, Figure 1, Sheet 1, is a perspective; Fig. 2, Sheet 1, is an end section, showing camera-slides, track, and background. Fig. 1, Sheet 2, is a section of slide-frame, showing trigger, lever, armature, and magnets. Fig. 2, Sheet 2, represents a photograph. Fig. 3, Sheet 2, represents a contact-plate.

Let A represent the track along which the horse is made to pass under speed. On one side of the track I place the photographic camera B, the tube of which is directed across the roadway or track. Immediately in front of the camera-tube I place the frame D, in which my double-acting slides $c$ $d$ are arranged. The two slides are mounted in the frame side by side, in parallel planes, so as to stand across the end of the camera-tube. Each slide has an opening, $e$, in it, which will usually be as wide as the diameter of the camera-tube, but in some instances I shall make it less.

The slide $c$ is connected by one or more springs, $r$, with the top of the frame D, while the slide $d$ is similarly connected with the bottom of the frame, so that when the two slides are drawn to their respective inactive positions the solid portion of each slide is opposite the opening in the adjoining slide, and a solid plate is presented in front of the camera-tube. To set these slides the upper one is drawn down and the lower one is drawn up until the openings $e$ pass each other and the solid portions come opposite the openings again, thus straining the springs $r$, in which position both slides are secured by a single lever, $f$, and trigger $g$. The lever $f$ catches lightly upon the trigger $g$, and the opposite end of the trigger is connected with a lever, G, which is pivoted at its middle to the outside of the frame, and the opposite end of which carries an armature, $h$. I I are electro-magnets, which are attached to the side of the frame under the armature. A wire, $j$, leads from these magnets to the battery, which may be conveniently located, while another wire, $k$, leads across the track, either underground or overhead, as hereinafter explained.

The background L is placed on the side of the track or roadway opposite that on which the camera and slide are located, so that the horse must pass between them. I prefer to paint this background white, so that the horse will stand out in better relief and his position and posture be more distinctly shown in the photograph. I also whiten the track between the camera and background. Near the bottom of this background I paint or otherwise delineate several lines or stripes, $l$ $l$, at different calculated spaces apart, so that the distance of the horse's feet from the ground at the instant the photograph is taken will be shown upon the picture by the position of the feet with relation to the lines.

On the rear side of the background I secure two metallic spring-plates, $m$ $m$, so that one will be slightly distant from the other. The wire $j$, which leads from the magnets I, I attach to one of these plates, and the other plate I connect by a wire with the battery. For a running horse I then attach one end of a strong thread, $o$, to the outside plate, $m$, and stretch it across the track at the proper height, so that the horse will run against and break it as he passes. The strain upon the thread when the horse runs against it will draw the outer plate, m, against the under plate and complete the circuit, thus electrifying the magnets so as to draw the armature against them and release the trigger. The instant the trigger is released the springs r draw the slides c d in opposite directions, so that the sensitive plate in the camera is instantaneously exposed as the openings e pass each other. The camera is so located with reference to the slides that it is directly opposite the openings when they coincide with each other, so that a full exposure is had.

For a trotting horse I operate the outer spring-plate, m, to make the connection with the under one by causing one of the wheels of the sulky or vehicle to pass over the connection that draws the plates together.

In order to take several successive views I employ a number of cameras and slides in connection with a single background of the required length. In this case I place the cameras at regular intervals apart and make a separate circuit and operating device for each. I also paint or otherwise mark the background with vertical lines s s at regular intervals apart, and number them successively by painting the numerals upon them. These vertical lines will then show the position and progress of the horse and his posture at each exposure.

I am aware that a graduated background used in photography for the purpose of ascertaining the velocity of a moving object in a given time is not new, and I do not, therefore, desire to be understood as claiming such a background, broadly; but, Having described my invention, what I do claim as new, and desire to secure by Letters Patent, is—

1. The background L, provided with vertical lines or gage-stripes $s$ and horizontal stripes or lines $l$, arranged substantially as shown and described, for the purpose of obtaining horizontal and vertical measurements of the passing object, as set forth.

2. The slides $c\ d$, set by means of the lever $f$, trigger $g$, and centrally-pivoted lever G, with its armature $h$, in combination with the electro-magnets I I, wires $j\ k$, and metallic spring-plates $m\ m$, constructed to operate substantially as and for the purpose described.

In witness whereof I have hereunto set my hand and seal.

E. J. MUYBRIDGE. [L. S.]

Witnesses:
D. B. LAWLER,
W. F. CLARK.